US009090328B2

(12) United States Patent
Goehlich

(10) Patent No.: US 9,090,328 B2
(45) Date of Patent: Jul. 28, 2015

(54) FUSELAGE SEGMENT AND METHOD FOR MANUFACTURING A FUSELAGE SEGMENT

(71) Applicant: Airbus Operations GmbH, Hamburg (DE)

(72) Inventor: Robert Alexander Goehlich, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 222 days.

(21) Appl. No.: 13/623,724

(22) Filed: Sep. 20, 2012

(65) Prior Publication Data

US 2013/0256457 A1    Oct. 3, 2013

Related U.S. Application Data

(60) Provisional application No. 61/536,639, filed on Sep. 20, 2011.

(30) Foreign Application Priority Data

Sep. 20, 2011  (DE) .......................... 10 2011 113 806

(51) Int. Cl.
*B64C 1/06* (2006.01)
*B64C 1/00* (2006.01)

(52) U.S. Cl.
CPC .................. *B64C 1/068* (2013.01); *B64C 1/069* (2013.01); *B64C 2001/0072* (2013.01); *Y02T 50/433* (2013.01); *Y10T 29/49826* (2015.01)

(58) Field of Classification Search
CPC ............ B64C 1/068; B64C 1/12; B64C 1/00; B64C 1/06; B64C 1/069; B64C 3/26; B64C 2001/0045; B64C 2211/00; B64C 7/00; B64F 5/0009; B64D 2011/0046; B64D 2011/0644; B64D 2011/0655
USPC ........... 244/117 R, 119, 120, 129.1, 131, 133
See application file for complete search history.

(56) References Cited

U.S. PATENT DOCUMENTS 6,708,924 B2 *   3/2004   Page et al. ........................ 244/36
7,784,736 B2 *   8/2010   Guering et al. ................ 244/119
(Continued)

FOREIGN PATENT DOCUMENTS

DE    102009009491 A1 *   9/2010
DE    10 2009 026 458     12/2010
(Continued)

OTHER PUBLICATIONS

German Office Action for Application No. 10 2011 113 806.8 dated Jun. 21, 2013.

*Primary Examiner* — Benjamin P Lee
(74) *Attorney, Agent, or Firm* — Jenkins, Wilson, Taylor & Hunt, P.A.

(57) ABSTRACT

Provided is a fuselage segment that extends in a longitudinal fuselage segment axis and is closed in a circumferential direction around this longitudinal fuselage segment axis. The fuselage segment features a plurality of shell components for forming a skin of the fuselage segment that respectively feature two first shell component edges extending along a longitudinal shell component direction and two second shell component edges extending along a lateral shell component direction. The shell components are respectively connected to at least one adjacent shell component along at least one first shell component edge and along at least one second shell component edge. Methods for manufacturing such a fuselage segment are also provided.

13 Claims, 5 Drawing Sheets

(56) References Cited

U.S. PATENT DOCUMENTS

Figure 1:
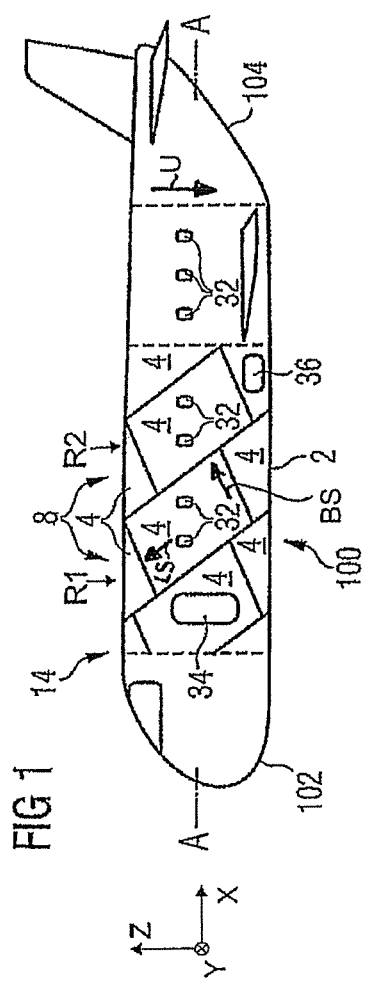

| | | | |
|---|---|---|---|
| 7,967,250 B2 * | 6/2011 | Lobato et al. | 244/119 |
| 8,240,607 B2 * | 8/2012 | Pahl | 244/120 |
| 8,292,225 B2 * | 10/2012 | Cazals et al. | 244/119 |
| 2008/0210813 A1 * | 9/2008 | Guering et al. | 244/102 R |
| 2009/0277994 A1 | 11/2009 | Lobato | |
| 2010/0025531 A1 * | 2/2010 | Pahl | 244/120 |
| 2010/0133377 A1 * | 6/2010 | Cazals et al. | 244/55 |
| 2010/0133382 A1 | 6/2010 | Pahl | |
| 2012/0213955 A1 * | 8/2012 | Biesek et al. | 428/34.1 |
| 2014/0134377 A1 * | 5/2014 | Goehlich et al. | 428/57 |

FOREIGN PATENT DOCUMENTS

| | | |
|---|---|---|
| DE | 102009057018 A1 * | 6/2011 |
| DE | BR PI0621804 A2 * | 12/2011 |
| DE | 102011113806 A1 * | 3/2013 |
| DE | EP 2117814 B1 * | 4/2013 |
| WO | WO 2010/136362 | 12/2010 |

* cited by examiner

FUSELAGE SEGMENT AND METHOD FOR MANUFACTURING A FUSELAGE SEGMENT

CROSS-REFERENCE TO RELATED APPLICATIONS

This application claims the benefit of and priority to German Patent Application No. DE 10 2011 113 806.8 and U.S. Provisional Patent Application No. 61/536,639 both filed on Sep. 20, 2011, the entire disclosures of which are hereby incorporated herein by reference.

TECHNICAL FIELD

The invention relates to a fuselage segment of a fuselage and in particular of an aircraft fuselage, and a method for manufacturing such a fuselage segment.

BACKGROUND

Aircraft fuselages are manufactured of aluminum, as well as of composite fiber materials, particularly carbon fiber-reinforced plastic that contains reinforcing fibers and, in particular, carbon fibers embedded in a plastic matrix. This involves the manufacture of aircraft fuselage sections or barrels in the form of straight cylinders that are composed of fuselage segments or shell components. A backing structure that features stringers extending in the longitudinal direction of the aircraft and frames arranged transverse thereto is provided on the inner side for reinforcement purposes. The shell components are then joined into straight cylinders that are also referred to as barrels. In this case, the shell components are connected to one another with rivets, wherein the shell components are arranged such that a longitudinal joint is formed, i.e., in a sectionally overlapping fashion. These straight cylinders are joined into an aircraft fuselage in the next step. The connection by means of a longitudinal joint, as well as the couplings, influences the overall weight of the aircraft fuselage.

It is the objective of the invention to make available a fuselage segment of a fuselage that is advantageous with respect to its weight and manufacturing costs, as well as a cost-efficient method for manufacturing such a fuselage segment that makes it possible to manufacture a fuselage segment with a relatively low weight and relatively low production costs.

This objective is attained with the characteristics of the independent claims. Other embodiments are specified in the dependent claims that refer to these independent claims.

SUMMARY

According to one embodiment, a fuselage segment is provided that extends in a longitudinal fuselage segment axis and is closed in a circumferential direction around the longitudinal fuselage segment axis, wherein the circumferential direction lies in a reference radial plane, relative to which the longitudinal fuselage segment axis extends perpendicularly, and wherein the fuselage segment comprises:
at least two pluralities of shell components each of which shell components respectively feature two first shell component edges lying opposed to each other and extending along a longitudinal shell component direction and two second shell component edges lying opposed to each other and extending along a lateral shell component direction,
wherein the shell components of each plurality of shell components are respectively connected to each other at their first shell component edges such that the respective plurality of shell components forms a ring-shaped skin section of the fuselage segment and has a centerline, which is defined as a connection line of the centers of the shortest distances between the second shell component edges respectively lying opposed to each other, and which forms a closed line which lies in a first radial plane which is inclined with regard to the reference radial plane by at least 5 degrees,
wherein at least two ring-shaped skin sections are connected to each other at the second shell component edges of the shell components of the adjacent ring-shaped skin sections.

According to an embodiment, the first radial plane is inclined with regard to the reference radial plane by at least 5 degrees and at maximum by 45 degrees.

The solution to the objective of the invention is based on a fuselage segment or fuselage section that extends in the longitudinal axis of the fuselage and in a longitudinal fuselage segment axis extending in the longitudinal direction of the aircraft fuselage and is closed in a circumferential direction around a coordinate axis in the form of this longitudinal fuselage segment axis, wherein the circumferential direction lies in a radial plane, relative to which the longitudinal fuselage segment axis extends perpendicularly. For example, the circumferential direction may extend around the longitudinal fuselage segment axis to the right such that the longitudinal fuselage segment axis, a radial coordinate positioned perpendicular thereto and an angle relative to the usually defined positive lateral axis of the aircraft fuselage define a cylindrical coordinate system. According to the invention, the circumferential line extending in the circumferential direction, for example, on the outside of the fuselage segment does not have to be shaped such that it forms a circular line or a segment of a circular line. The outer contour of the local cross section of the fuselage segment resulting along the longitudinal fuselage segment axis preferably is symmetrical referred to the usually defined positive vertical axis of the aircraft fuselage.

The shell components are arranged in such a way that they form a closed shell in the circumferential direction such that the fuselage segment features a plurality of shell components or a shell component row of shell components in order to form a skin that is closed in the circumferential direction. According to the invention, the fuselage segment features: a plurality of shell components for forming a skin of the fuselage segment that respectively feature two first shell component edges or longitudinal shell component edges that respectively extend along a longitudinal shell component direction and two second shell component edges or lateral shell component edges that respectively extend along a lateral shell component direction, as well as a support structure, on which each of the shell components is mounted. According to the invention, it is proposed, in particular, that the plurality of shell components is arranged in such a way that at least the direction of a tangent on first shell component edges or the local direction of the first shell component edges, on which two shell components are respectively connected to one another, and/or the direction of a tangent on second shell component edges or the local direction of the second shell component edges, on which two shell components are respectively connected to one another, at least sectionally extend at an acute angle ($\alpha$) relative to the radial plane defined by the longitudinal fuselage segment axis, preferably at an angle ($\alpha$) of at least 10 degrees and, in particular, an angle ($\alpha$) of 30° to 60° relative to the radial plane defined by the longitudinal fuselage segment axis. In this context, the expression "at least sectionally" should be interpreted in such a way that the respective edges have the specified orientation over at least 50% of their length and, in particular, the central section of their length or lateral section referred to the vertical axis of the fuselage.

If the first or second shell component edges extend in a curved fashion, the invention proposes that, depending on the shape of this curvature, at least the direction of a tangent on the first shell component edges, on which two shell components are respectively connected to one another, and/or on second shell component edges, on which two shell components are respectively connected to one another, generally extend at an acute angle ($\alpha$) relative to the longitudinal fuselage segment axis and, in particular, at an angle ($\alpha$) of 30° to 60° relative to the longitudinal fuselage segment axis over at least 50% or, in embodiments that are preferred with respect to manufacturing aspects, especially 75% of their respective length along the circumferential direction. In this case, the respective sections defined with 50% and 75% of the respective length could consist, in particular, of exactly the central section of the respective overall length.

According to an embodiment of the invention, a fuselage segment is proposed that features: at least one shell component row that, in order to form the skin of the fuselage segment, is respectively composed of shell components that are arranged behind one another viewed in a longitudinal shell component row direction of the respective shell component row and respectively feature longitudinal shell component edges extending along the longitudinal shell component direction and lateral shell component edges extending transverse thereto, wherein two shell components are respectively connected to one another on the lateral shell component edges. According to another embodiment of the invention, it is proposed that at least two shell component rows of the plurality of shell component rows are at least sectionally connected to one another on the longitudinal shell component row edges formed by the longitudinal shell component edges of the shell components of the respective shell component row, wherein the longitudinal shell component direction results as center line referred to the longitudinal shell component edges of the respective shell component row, and wherein the local direction of the respective center lines of the shell component rows respectively extends at an angle ($\alpha$) that is not equal to 0 degrees or preferably greater than 10 degrees and, in particular, at an angle ($\alpha$) between 30° and 60 degrees relative to the radial plane defined by the longitudinal fuselage segment axis, i.e., it respectively extends at an angle ($\alpha$) of less than 90 degrees and preferably less than 80 degrees, particularly at an angle ($\alpha$) between 30° and 60 degrees, relative to the longitudinal fuselage segment axis. According to the invention, it would be possible, in particular, that the longitudinal shell component direction of the shell component rows deviates from the longitudinal fuselage segment axis of the fuselage segment by an angle ($\alpha$) of 30° to 60° and/or that the lateral shell component edges of the shell components of the shell component rows deviate from the longitudinal fuselage segment axis by an angle ($\alpha$) of 30° to 60°.

The angular dimension between a line such as a center line or an edge, e.g., a longitudinal edge or lateral edge, and the longitudinal fuselage segment axis is herein generally taken from an angle that results if this line is projected on a plane defined by this line and a line extending parallel to the longitudinal fuselage segment axis.

The center line of a shell component row is herein defined as the connection between all centroids of each shell component of a shell component row. The center line of a shell component row may herein also be defined as the line extending in the longitudinal direction of the respective shell component row, from which the longitudinal shell component edges are spaced apart by the same shortest distance.

According to the invention, the direction of a tangent on connecting lines or longitudinal directions of connecting sections, in which the first or second shell component edges ideally result from the connection of two respectively interconnected shell components, therefore respectively at least sectionally extends at an angle ($\alpha$) of more than 10 degrees, preferably less than 80 degrees, particularly at an acute angle, relative to a longitudinal fuselage segment axis that extends in the longitudinal direction of the aircraft fuselage. In the connecting sections, the respectively interconnected shell components adjoin one another in a planar fashion. The interconnected shell components may also be connected in a planar fashion in the connecting sections, e.g., by means of an adhesive connection or fixed on one another, e.g., by means of connecting elements such as, e.g., rivets such that the respectively interconnected shell components adjoin one another in a planar fashion. The aircraft fuselage therefore features a plurality of shell components that are respectively connected to their immediate shell component neighbors along their contacting shell component edges or outer edges. The ideally resulting connecting line in the respective connecting region of two interconnected shell components is the ideally resulting common edge line that results when shell component edges adjoin one another end to end. If interconnected shell components are connected to one another and, e.g., bonded such that they overlap one another with respective edge sections, an overlapping or connecting section that is respectively situated along and between the shell component edges that lie closest to one another respectively results in the respective connecting region of two interconnected shell components. Since at least one of the two connecting lines or connecting sections is correspondingly curved due to the curved surface of the aircraft fuselage, a tangent on the connecting lines or the surface shape or surface contour of the connecting sections can be used for determining the angle. The determination of the direction of the respective tangent or of the angle between this tangent and the longitudinal fuselage segment axis can be realized, e.g., with a projection of the at least one connecting line on a plane, in which the longitudinal fuselage segment axis lies. The course of one of the two connecting lines or connecting sections can be described as follows: a vector that extends perpendicular to the longitudinal fuselage segment axis rotates about the longitudinal fuselage segment axis and is simultaneously displaced along the longitudinal fuselage segment axis such that the course of the connecting line results from a superposition of these two motions. For example, if the motion along the longitudinal fuselage segment axis takes place with a constant speed in one direction, the result of this superposition is a helix or helical line. However, if the direction of the motion along the longitudinal fuselage segment axis is changed, e.g., during one revolution of the vector, the superposition results in a closed line such as, e.g., an ellipse. This applies analogously to the connecting sections. In this way, the length, e.g., of the first connecting line is increased in comparison with the arrangement known from the prior art. This improves the stability of the connection between the shell components because the contact surface between two shell components is increased. Brackets and additional couplings therefore are not required for producing the connection between the shell components. Furthermore, this makes it possible to reduce the overlapping region in a connection in the form of a longitudinal joint. This reduction of the overlap and/or the elimination of brackets and/or the elimination of couplings result in an aircraft fuselage with significantly reduced weight. It is furthermore possible to eliminate riveted connections such that the manufacture is simplified and the weight of the aircraft fuselage is additionally reduced because the aircraft fuselage does not feature any rivets.

According to an embodiment of the invention, shell components that are joined along such first connecting lines result, e.g., in a subcomponent of the aircraft fuselage in the form of an obliquely cut cylinder. The obliquely cut cylinders result in an essentially cylindrical center section of an aircraft fuselage or fuselage segment once they are joined. Such an obliquely cut cylinder refers to a body that features two plane end faces (also referred to as bottom area and top area). The end faces may have a circular, elliptical or any other suitable shape. In contrast to a straight cylinder, the two end faces are arranged at an angle relative to the symmetry axis or rotational axis of the obliquely cut cylinder that does not correspond to a right angle. In other words, the symmetry axis or rotational axis extends perpendicular to the plane of the end face, e.g., in the case of a straight cylinder with circular end faces, wherein this is not the case in an obliquely cut cylinder with the same end faces. Consequently, the symmetry axis or rotational axis extends parallel to or coincides with the longitudinal fuselage segment axis of the aircraft fuselage in straight circular cylinders while the axis in an obliquely cut cylinder extends relative to the longitudinal fuselage segment axis of the aircraft fuselage at an angle greater than zero, e.g., an acute angle. If the two end faces do not have the same size and/or shape, the shell components result, e.g., in an obliquely cut truncated cone, wherein the truncated cone is based on an oblique cone. This makes it possible to manufacture sections of an aircraft fuselage, the shape of which significantly deviates from the basic cylindrical shape such as, e.g., the cockpit section or tail section. According to an embodiment of the invention, it is proposed that the longitudinal shell component direction of the shell component rows is arranged such that it deviates from the longitudinal fuselage segment axis of the aircraft fuselage by an angle of 30° to 60°. According to an embodiment of the invention, it is alternatively or additionally proposed that the lateral shell component edges of the shell components of the shell component rows are arranged such that they deviate from the longitudinal fuselage segment axis of the aircraft fuselage or fuselage segment or extend relative to the radial plane defined by the longitudinal fuselage segment axis (A) by an angle ($\alpha$) of 30° to 60°. It is proposed, in particular, that the tangent of the first connecting line of respective first shell component edges is arranged such that it extends relative to the radial plane defined by the longitudinal fuselage segment axis (A) or deviates from the longitudinal fuselage segment axis of the aircraft fuselage by an angle of 30° to 60°. Due to the selection of a value for the angle in this region, the length of the first connecting line is significantly increased, particularly at an angle of 45°, such that it is possible, e.g., to realize the overlapping sections particularly small and an aircraft fuselage with a particularly low weight is produced. According to an embodiment of the invention, it is proposed that the longitudinal shell component edges of the nominal surface of a plurality of shell components that is developed on the plane extend parallel to one another over at least 75% of the length of the respective longitudinal shell component edges.

According to an embodiment of the invention, it is proposed that several of the shell component rows of the plurality of shell component rows respectively form a closed ring and several such ring-shaped shell component rows are arranged behind one another in the longitudinal fuselage segment axis. In this case, the longitudinal edges or lateral edges or their center lines or their aforementioned relevant sections define a cross-sectional plane that forms an angle of more than 0°, particularly an angle of more than 10°, with the radial plane defined by the longitudinal fuselage segment axis.

According to an exemplary embodiment, a fuselage segment is proposed that is composed of several ring-shaped shell component rows arranged behind one another in the longitudinal fuselage segment axis, wherein the longitudinal edges or lateral edges or the center lines or the aforementioned relevant sections of these shell component rows form cross-sectional planes, the angle of which relative to the radial plane defined by the longitudinal fuselage segment axis increases along the longitudinal fuselage segment axis and as their longitudinal coordinate increases from shell component row to shell component row. According to another exemplary embodiment, it is proposed that the ring-shaped shell component rows are realized in such a way that the angle increases up to a central region of the fuselage segment, and that the longitudinal edges or lateral edges or the center lines of the ring-shaped shell component rows arranged behind one another or their aforementioned relevant sections form in the further extent of the longitudinal fuselage segment axis and as their longitudinal coordinate increases cross-sectional planes, the angle of which relative to the radial plane defined by the longitudinal fuselage segment axis decreases along the longitudinal fuselage segment axis and as their longitudinal coordinate increases from shell component row to shell component row.

According to an embodiment, an aircraft fuselage is proposed, the front fuselage section or nose of which, i.e., the region that includes the cockpit, does not feature any shell components that are realized and arranged in accordance with the invention.

According to another embodiment of the invention, it is proposed that the fuselage segment is composed of several ring-shaped shell component rows that are arranged behind one another in the longitudinal fuselage segment axis and the longitudinal edges or lateral edges of which or the center lines or sections of which form cross-sectional planes, the angle of which relative to the radial plane defined by the longitudinal fuselage segment axis (A) increases along the longitudinal fuselage segment axis (A) and as their longitudinal coordinate increases from shell component row (R1, R2, R3) to shell component row up to a central region of the fuselage segment that consists, in particular, of the wing connecting region, and the angle of which relative to the radial plane defined by the longitudinal fuselage segment axis (A) decreases along the longitudinal fuselage segment axis (A) and as their longitudinal coordinate increases from shell component row (R1, R2, R3) to shell component row behind the central region of the fuselage segment.

According to another embodiment of the invention, it is alternatively or additionally proposed that several shell component rows of the plurality of shell component rows are arranged behind one another in the longitudinal shell component direction, wherein two respective shell component rows that are arranged behind one another are connected at their ends that are formed by lateral shell component edges such that the several shell component rows altogether extend in a helical fashion in the circumferential direction. In this case, the longitudinal edges or lateral edges or the center lines or their aforementioned relevant sections define an inclination angle of more than 10 degrees relative to the longitudinal fuselage segment axis.

According to an embodiment of the invention, it is proposed that several shell component rows of the plurality of shell component rows are connected to one another end to end, particularly by means of welding. According to another embodiment of the invention, it is proposed that the connection of longitudinal shell component edges and/or lateral shell component edges of respectively different interconnected shell components is realized in such a way that the respective interconnected shell components overlap one another with edge sections extending on the respective longitudinal shell component edges and/or lateral shell component edges, and that the respective overlapping edge sections are bonded to one another. Both embodiments may also be combined on a fuselage segment.

According to an embodiment of the invention, it is proposed that at least one shell component features at least one opening in the form of a window opening for installing a window glass and/or a passenger door opening for installing a passenger door and/or a cargo door opening for installing a cargo door, wherein the respective peripheral edge of the opening is situated within the region, in which the respective shell component extends in a planar fashion.

DETAILED DESCRIPTION

According to the invention, it is therefore proposed that the tangent of the second connecting line may extend parallel or perpendicular to the longitudinal fuselage segment axis of the aircraft fuselage. In order to produce a particularly stable aircraft fuselage that has a particularly low weight, it is advantageously proposed that the tangent of the second connecting line is arranged such that it extends relative to the radial plane defined by the longitudinal fuselage segment axis (A) or deviates from the longitudinal fuselage segment axis of the aircraft fuselage by an acute angle, particularly an angle of 30° to 60°. Consequently, the length of the second connecting lines is also increased and the connections along the second connecting lines therefore are improved. In this case, the second connecting lines may be arranged, e.g., such that they extend perpendicular to the first connecting lines, i.e., their tangents.

In order to simplify the manufacture of the aircraft fuselage, it is advantageously proposed that the shell component surface of the shell components or the shell component is larger than the window surface of a window opening and/or the passenger door surface of a passenger door and/or the cargo hold door surface of a cargo hold door.

This makes it possible to arrange window openings and/or passenger door openings and/or cargo door openings within one respective shell component or shell component. Consequently, the external shape or border of the shell component or the shell component, along which the first and second connecting lines extend, does not have to be modified. This simultaneously eliminates the need to modify the course of the first and second connecting lines for window openings and/or passenger door opening and/or cargo door openings, wherein this would otherwise reduce the stability of the aircraft fuselage. The shell components or shell components may have any suitable shape such as, e.g., the shape of squares, trapezoids such as, e.g., isosceles trapezoids, rhombi, parallelograms or even triangles that are curved about one or two axes in order to form the aircraft fuselage. In this case, it would be possible, in particular, that rounded end sections respectively connect a first and a second shell component edge in order to avoid corners at these locations. In a preferred embodiment, it is proposed that the shell components have the shape of rectangles that are curved about one or two axes. These rectangular shell components have a size, e.g., between 1 $m^2$ and up to 12 $m^2$. Due to the selection of these surface dimensions, one or more window openings may be arranged, e.g., in a shell component with a size, e.g., of 1 by 1 meter while a passenger door opening or cargo door opening can be arranged in a shell component with a size, e.g., of 4 by 3 meters.

If a plurality of identically shaped shell components is used, the first and second connecting lines can be produced with a welding robot that merely needs to be programmed with a program for producing these welded connections because the course of the first and second connecting lines is respectively identical due to the identical shell components. The manufacturing effort therefore is simplified because such a welding robot only needs to be programmed once in order to travel along the identical welding paths.

Since the aircraft fuselage is manufactured of a plurality of shell components, the shape of the fuselage section or aircraft fuselage such as, e.g., its length can be varied with the number of shell components used without requiring new tools or modifications of existing tools for this purpose.

The manufacture can be simplified and standardized due to the fact that identical welding paths need to be traveled when welding together identical shell components or shell components. In this way, the time required for completing the learning curve is reduced. Furthermore, the manufacturing costs are reduced due to batch size effects that are identical to the welding process when welding together identical shell components.

The shell components or shell components may be arranged in such a way that the second connecting lines are closed and, e.g., have the shape of ellipses. It is preferred to arrange at least one of the two connecting lines of the shell components in an offset fashion referred to at least one of the two connecting lines of an adjacent shell component. For example, the second connecting lines therefore do not form any closed lines, but rather meet the first connecting lines at an angle, e.g., of 90°, i.e., there are no junction points between the first and second connecting lines, at which the second connecting lines end. The offset arrangement of the shell components allows a particularly simple arrangement, in which a plurality of window openings is situated within shell components at the same height of an aircraft fuselage. Furthermore, shell components may be arranged such that passenger door openings and cargo door openings are arranged within shell components at a suitable height of the aircraft fuselage.

The aircraft fuselage or the fuselage section may be manufactured of a composite fiber material, particularly of carbon fiber-reinforced plastic that contains reinforcing fibers and, in particular, carbon fibers embedded in a plastic matrix, or of a metal such as, e.g., aluminum. Shell components of a composite fiber material, particularly of carbon fiber-reinforced plastic, or of a metal such as, e.g., aluminum are used for this purpose. If the shell components consist of or comprise a composite fiber material, particularly of carbon fiber-reinforced plastic, in accordance with a preferred exemplary embodiment, the shell components feature adhesive connections along their first connecting lines and/or along their second connecting lines. The adhesive connections may be produced such that a longitudinal joint is formed, i.e., the shell components feature overlapping sections that overlap in the region of the first and second connecting lines such that the aircraft fuselage has a greater thickness in this section than in other sections. However, if shell components are made of metal in accordance with another preferred exemplary embodiment, they feature welded connections along their first connecting lines and/or along their second connecting lines, particularly welded connections that are produced such that a butt joint is formed. The welded connections may be produced, e.g., by means of friction stir welding. However, it is also possible to use other friction welding methods such as, e.g., rotary friction welding, ultrasonic friction welding or orbital friction welding.

If the shell components consist or comprise of a composite fiber material, particularly of carbon fiber-reinforced plastic, they preferably have a changing thickness in the overlapping region. In this case, the thickness of the shell components changes in a direction that corresponds to the direction of a joining motion carried out in order to connect two shell components to one another along their first connecting line or along their second connecting line. This makes it possible to reduce the overall thickness of the aircraft fuselage in the overlapping region and therefore the weight of the aircraft fuselage. Furthermore, the manufacture is simplified because the changing thickness makes it possible to eliminate or reduce the effort for compensating manufacturing tolerances, namely the so-called shimming that is carried out, e.g., by filling gaps with a compensation mass.

The aircraft fuselage may furthermore feature a support structure or backing structure for reinforcing the shell components. Such a backing structure may feature frames and stringers, both of which are connected to the shell components and to one another. According to a first preferred embodiment, the backing structure features frames and stringers that are arranged perpendicular to one another. Consequently, the stringers extend parallel to the longitudinal fuselage segment axis of the aircraft fuselage while the frames extend perpendicular to the longitudinal fuselage segment axis of the aircraft fuselage. This design allows the utilization of known backing structures with frames and stringers that are arranged perpendicular to one another. According to a second preferred embodiment, the backing structure features stringers that extend parallel to the principal direction of the aircraft fuselage. Furthermore, the backing structure features frames that are arranged such that they extend relative to the radial plane defined by the longitudinal fuselage segment axis (A) or deviate from the longitudinal fuselage segment axis of the aircraft fuselage by an acute angle, particularly an angle of 30° to 60°. Consequently, the frames and stringers are not arranged perpendicular to one another. Particularly the frames may be angled relative to the longitudinal fuselage segment axis by an angle that corresponds to the angle of the first or second connecting line. Consequently, this arrangement results in an aircraft fuselage with a backing structure that is adapted thereto such that a particularly lightweight and stable aircraft fuselage is produced. According to a third preferred embodiment, the backing structure features frames that are arranged such that they deviate from the longitudinal fuselage segment axis of the aircraft fuselage, in particular, by an angle of 30° to 60°. The backing structure furthermore features stringers that are arranged such that they extend relative to the radial plane defined by the longitudinal fuselage segment axis (A) or deviate from the longitudinal fuselage segment axis of the aircraft fuselage by an acute angle, particularly an angle of 30° to 60°. Consequently, it is possible to arrange, e.g., the frames such that they extend parallel to the first connecting lines and the stringers such that they extend parallel to the second connecting seams. This means that the stringers and frames respectively extend at the same angle relative to the longitudinal fuselage segment axis as the first and second connecting lines. Consequently, the stringers and frames can support the region of the first and second connecting lines and therefore increase the stability of the aircraft fuselage.

The objective of the invention is furthermore attained with a method for manufacturing an aircraft fuselage, in which a shell component is connected to a first adjacent shell component along a first connecting line and to a second adjacent shell component along a second connecting line in order to form the aircraft fuselage, wherein the shell components are, according to the invention, arranged in such a way that at least the direction of a tangent of one of the two connecting lines extends at an acute angle relative to a longitudinal fuselage segment axis extending in the longitudinal direction of the aircraft fuselage. The aircraft fuselage therefore is composed of a plurality of shell components or shell components that are respectively connected to the immediately adjacent shell components along their contacting outer edges. A plurality of shell components collectively forms a shell component row. In this context, an acute angle refers to an angle with a value between 0° and 90°. Since at least one of the two connecting lines is correspondingly curved due to the curved surface of the aircraft fuselage, a tangent of one of the two connecting lines is used for determining the angle. The direction of the tangent is then compared with the direction of the longitudinal fuselage segment axis in order to determine the angle. In other words, the angle is determined, e.g., by projecting the at least one connecting line on a plane, in which the longitudinal fuselage segment axis lies. The course of one of the two connecting lines can be described as follows: a vector that extends perpendicular to the longitudinal fuselage segment axis rotates about the longitudinal fuselage segment axis and is simultaneously displaced along the longitudinal fuselage segment axis such that the course of the connecting line results from a superposition of these two motions. For example, if the motion along the longitudinal fuselage segment axis takes place with a constant speed in one direction, the result of this superposition is a helix or helical line. However, if the direction of the motion along the longitudinal fuselage segment axis is changed, e.g., during one revolution of the vector, the superposition results in a closed line such as, e.g., an ellipse.

In this way, the length, e.g., of the first connecting line is increased in comparison with the arrangement known from the prior art. This improves the connection between the shell components because the contact surface between two shell components is increased. Brackets and additional couplings therefore are not required. Furthermore, this makes it possible to reduce the overlapping region in a connection in the form of a longitudinal joint. This reduction of the overlap and/or the elimination of brackets and/or the elimination of couplings result in an aircraft fuselage with significantly reduced weight. It is furthermore possible to eliminate riveted connections such that the manufacture is simplified and the weight of the aircraft fuselage is additionally reduced because the aircraft fuselage does not feature any rivets.

Since the shell components are joined along the first connecting lines, they result, e.g., in a subcomponent of the aircraft fuselage in the form of an obliquely cut cylinder. The obliquely cut cylinders result in an essentially cylindrical center section of an aircraft fuselage once they are joined. Such an obliquely cut cylinder refers to a body that features two plane end faces (also referred to as bottom area and top area). The end faces may have a circular, elliptical or any other suitable shape. In contrast to a straight cylinder, the two end faces are arranged at an angle relative to the symmetry axis or rotational axis of the obliquely cut cylinder that does not correspond to a right angle. In other words, the symmetry axis or rotational axis extends perpendicular to the plane of the end face, e.g., in the case of a straight cylinder with circular end faces, wherein this is not the case in an obliquely cut cylinder with the same end faces. Consequently, the symmetry axis or rotational axis extends parallel to or coincides with the longitudinal fuselage segment axis of the aircraft fuselage in straight circular cylinders while the axis in an obliquely cut cylinder extends relative to the longitudinal fuselage segment axis of the aircraft fuselage at an angle greater than zero, e.g., an acute angle. If the two end faces do not have the same size and/or shape, the shell components result, e.g., in an obliquely cut truncated cone, wherein the truncated cone is based on an oblique cone. This makes it possible to manufacture sections of an aircraft fuselage, the shape of which significantly deviates from the basic cylindrical shape such as, e.g., the cockpit section or tail section.

Due to the arrangement of the shell components, e.g., in the form of obliquely cut cylinders, the length of the first connecting line is increased in comparison with straight cylinders. This improves the connection between the oblique cylinders because the contact surface between two oblique cylinders is increased. Brackets and additional couplings therefore are not required for connecting the stringers and the frames. Furthermore, this makes it possible to reduce the overlapping region in a connection in the form of a longitudinal joint. This reduction of the overlap and/or the elimination of brackets and/or the elimination of couplings result in an aircraft fuselage with significantly reduced weight. It is furthermore possible to eliminate riveted connections such that the manufacture is simplified and the weight of the aircraft fuselage is additionally reduced because the aircraft fuselage does not feature any rivets.

It is proposed to preferably arrange the shell components in such a way that the direction of the tangent of the first connecting line deviates from the longitudinal fuselage segment axis of the aircraft fuselage by an acute angle, particularly an angle of 30° to 60°. Due to the angular arrangement in this region, particularly at an angle of 30° to 60° such as, e.g., an angle of 45°, the length of the first connecting line is significantly increased such that it is possible, e.g., to realize the overlapping sections particularly small and an aircraft fuselage with a particularly low weight is produced.

The tangent of the second connecting line between two respectively closest adjacent edges of corresponding shell components or shell component rows may extend parallel or perpendicular to the longitudinal fuselage segment axis of the aircraft fuselage. In order to produce a particularly stable aircraft fuselage that has a particularly low weight, it is proposed to preferably arrange the shell components in such a way that the tangent of the second connecting line deviates from the longitudinal fuselage segment axis of the aircraft fuselage by an acute angle, particularly an angle of 30° to 60°. Consequently, the length of the second connecting line is also increased and the connections along the second connecting lines therefore are improved. In this case, the second connecting lines may be arranged, e.g., such that they extend perpendicular to the first connecting lines. In order to simplify the manufacture of the aircraft fuselage, it is proposed to preferably utilize shell components or a shell component with a segment surface or shell component surface that is larger than the window surface of a window opening and/or the passenger door surface of a passenger door and/or the cargo hold door surface of a cargo hold door. This makes it possible to arrange window openings and/or passenger door openings and/or cargo door openings within one respective shell component. Consequently, the external shape or border of the shell component, along which the first and second connecting lines extend, does not have to be modified. The shell components used may have any suitable shape such as, e.g., the shape of squares, trapezoids such as, e.g., isosceles trapezoids, rhombi, parallelograms or even triangles that are curved about one or two axes in order to form the aircraft fuselage. In a preferred embodiment, it is proposed that the shell components have the shape of rectangles that are curved about one or two axes. For example, these rectangular shell components have a size, e.g., between 1 $m^2$ and up to 12 $m^2$. Due to the selection of these surface dimensions, one or more window openings may be arranged, e.g., in a shell component with a size, e.g., of 1 by 1 meter while a passenger door opening or cargo door opening can be arranged in a shell component with a size, e.g., of 4 meters by 3 meters.

The rows of shell components or shell components may be arranged in such a way that the second connecting lines are closed and, e.g., have the shape of ellipses. It is preferred to arrange at least one of the two connecting lines of the shell components in an offset fashion referred to at least one of the two connecting lines of a respective adjacent shell component. The second connecting lines therefore do not form any closed lines, but rather meet the first connecting lines at an angle, e.g., of 90°, i.e., there are no junction points between the first and second connecting lines, at which the second connecting lines end. The offset arrangement of shell components or shell components relative to the respectively closest adjacent shell components in the direction extending transverse to the longitudinal direction of the row of shell components allows a particularly simple arrangement of a plurality of shell components, in which a plurality of window openings are situated within shell components at the same height of an aircraft fuselage. Furthermore, the shell components may be arranged such that passenger door openings and cargo door openings are arranged within shell components at a suitable height of the aircraft fuselage.

A composite fiber material, particularly of carbon fiber-reinforced plastic that contains reinforcing fibers and, in particular, carbon fibers embedded in a plastic matrix, or a metal such as, e.g., aluminum may be used as material for the aircraft fuselage. If the shell components used consist or comprise of a composite fiber material, particularly of carbon fiber-reinforced plastic, in accordance with a preferred exemplary embodiment, the shell components or shell components were bonded along their first connecting lines and/or along their second connecting lines. The adhesive connections may be produced such that a longitudinal joint is formed, i.e., the respectively interconnected shell components or shell components feature overlapping sections that overlap in the region of the first and second connecting lines such that the aircraft fuselage has in this section about twice the thickness of other sections. However, if shell components of metal are used in accordance with another preferred exemplary embodiment, the shell components are welded along their first connecting lines and/or along their second connecting lines or edge lines, particularly such that a butt joint is formed. The welding process may be realized, e.g., in the form of friction stir welding. However, it is also possible to use other friction welding methods such as, e.g., rotary friction welding, ultrasonic friction welding or orbital friction welding.

If a plurality of identically shaped shell components is used, the first and second connecting lines can be produced with a welding robot that merely needs to be programmed with a program for producing these welded connections because the course of the first and second connecting lines is respectively identical due to the identical shell components. The manufacturing effort therefore is simplified because such a welding robot only needs to be programmed once.

Since the aircraft fuselage is manufactured of a plurality of shell components, the shape of the fuselage section or aircraft fuselage such as, e.g., its length furthermore can be varied with the number of shell components used without requiring new tools or modifications of existing tools for this purpose.

If the shell components used consist or comprise of a composite fiber material, particularly of carbon fiber-reinforced plastic, it is proposed that they preferably have a changing thickness in the overlapping region. In this case, the thickness of the shell components changes in a direction that corresponds to the direction of a joining motion carried out in order to connect two shell components to one another along their first connecting lines or along the second connecting lines. This makes it possible to reduce the overall thickness of the aircraft fuselage in the overlapping region and therefore the weight of the aircraft fuselage. Furthermore, the manufacture is simplified because the changing thickness makes it possible to eliminate or reduce the effort for compensating manufacturing tolerances, namely the so-called shimming.

The aircraft fuselage may furthermore be provided with a backing structure for respectively reinforcing the shell components or shell components or shell component rows. Such a backing structure is composed of frames and stringers, both of which are respectively connected to the shell components or shell components or shell component rows and to one another. According to a first preferred embodiment, the frames and stringers of the backing structure are arranged perpendicular to one another. Consequently, the stringers extend parallel to or along the longitudinal fuselage segment axis of the aircraft fuselage while the frames extend perpendicular to the longitudinal fuselage segment axis of the aircraft fuselage. This design allows the utilization of known backing structures with frames and stringers that are arranged perpendicular to one another. According to a second preferred embodiment, the stringers of the backing structure are arranged such that they extend parallel to the principal direction of the aircraft fuselage. The frames of the backing structure, however, are arranged such that they deviate from the longitudinal fuselage segment axis of the aircraft fuselage by an acute angle, particularly an angle of 30° to 60°. It would be possible, in particular, that the frames extend and are mounted on the inner side of the shell components or shell component rows that faces the longitudinal fuselage axis in the form of ribs, namely in such a way that the load-bearing contact surfaces of the respective frames adjoin the shell components or shell component rows in the connecting regions between two respectively interconnected shell component rows in order to accommodate the shell components or shell component rows. In this context, it would be possible, in particular, that both of the respective interconnected shell components of different and respectively closest adjacent shell component rows are respectively mounted on a frame. This connection of ribs to shell components of different and respectively closest adjacent shell component rows may also be realized on ribs in the form of the stringers that extend along the longitudinal fuselage axis and transverse to the frames. The connecting regions may comprise, in particular, the overlapping regions or the joint regions of interconnected shell components.

According to an embodiment of the inventive solution, the frames and stringers therefore are not arranged perpendicular to one another. Particularly the frames may be angled relative to the longitudinal fuselage segment axis by an angle that corresponds to the angle of the first or second connecting line. This arrangement therefore results in an aircraft fuselage with a backing structure that is adapted thereto such that a particularly lightweight and stable aircraft fuselage is produced. According to a third preferred embodiment, the frames of the backing structure are arranged such that they deviate from the longitudinal fuselage segment axis of the aircraft fuselage, in particular, by an angle of 30° to 60°. The stringers of the backing structure furthermore are arranged such that they deviate from the longitudinal fuselage segment axis of the aircraft fuselage by an acute angle, particularly an angle of 30° to 60°. Consequently, it is possible to arrange, e.g., the frames such that they extend parallel to the first connecting lines and the stringers such that they extend parallel to the second connecting seams. This means that the stringers and frames respectively extend at the same angle relative to the longitudinal fuselage segment axis as the first and second connecting lines. The stringers and frames therefore can support the region of the first and second connecting lines and thusly increase the stability of the aircraft fuselage.

According to an aspect of the invention, a method for manufacturing a fuselage segment that extends in a longitudinal fuselage segment axis and is closed in a circumferential direction extending around this longitudinal fuselage segment axis by means of shell components that are mounted on a support structure and form a skin of the fuselage segment is proposed. According to an embodiment of this method, it is proposed, in particular, that a plurality of shell component rows are formed on the support structure by arranging and mounting shell components on the support structure in such a way that at least the direction of a tangent on first shell component edges, on which two respective shell components are connected to one another, and/or on second shell component edges, on which two respective shell components are connected to one another, extend at an acute angle relative to the longitudinal fuselage segment axis and, in particular, an angle ($\alpha$) of 30° to 60° relative to the longitudinal fuselage segment axis.

According to an aspect of the invention, a method for manufacturing a fuselage segment that extends in a longitudinal fuselage segment axis extending in the longitudinal direction of the aircraft fuselage and is closed in a circumferential direction extending around this longitudinal fuselage segment axis by means of shell components that are mounted on a support structure and form a skin of the fuselage segment is furthermore proposed, wherein a plurality of shell component rows are formed on the support structure by arranging and mounting shell components on the support structure in such a way that the local direction of the center line of the respective shell component rows being formed extends relative to the longitudinal fuselage axis or longitudinal fuselage segment axis at an angle of less than 90 degrees, particularly an acute angle.

According to an embodiment of the inventive method for manufacturing a fuselage segment, it is proposed to arrange and mount the shell components on the support structure in such a way that one respective shell component row is successively arranged behind another respective shell component row in the longitudinal fuselage segment axis. This is realized by mounting the shell components or shell components on the frames and stringers in one step. In this case, it would furthermore be possible to join the fuselage segments or shell components into straight cylinders that are also referred to as barrels, wherein the shell components may be arranged, in particular, in the form of a longitudinal joint arrangement, i.e., in a sectionally overlapping fashion. In the next step, these straight cylinders are joined into an aircraft fuselage. For this purpose, the cylinders or barrels are arranged such that a longitudinal joint is formed, i.e., in a sectionally overlapping fashion, and then connected to one another by means of a bracket. Couplings may be provided for connecting the stringers and frames.

An acute angle herein refers to an angle with a value between 0° and 90°.

Figure 2:
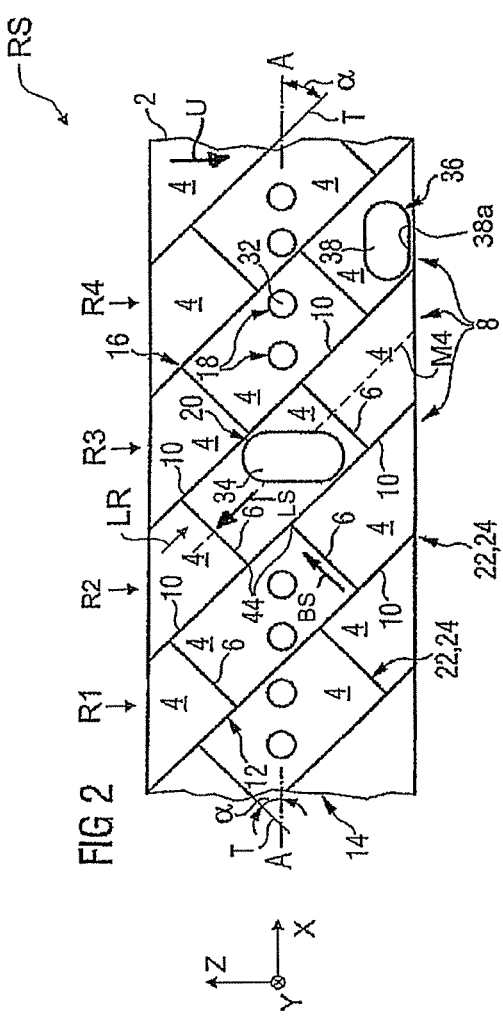
Figure 3:
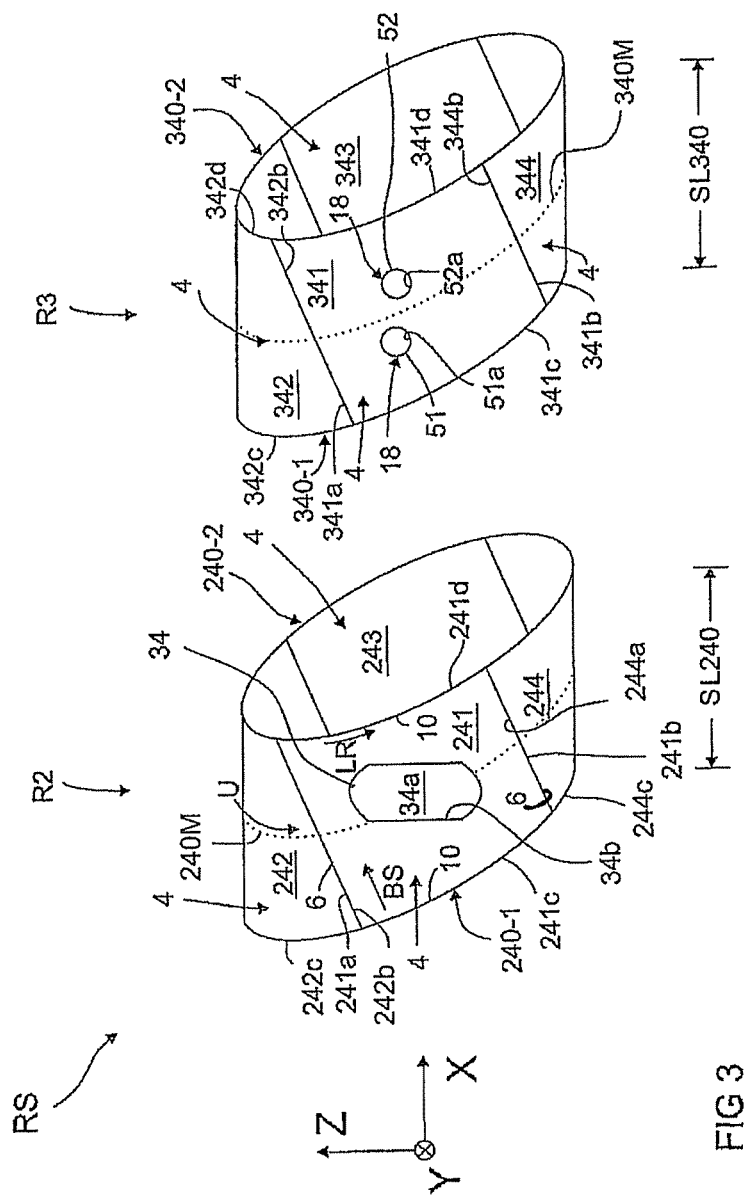
Figure 4:
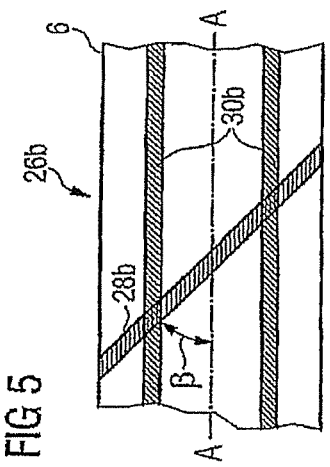
Figure 5:
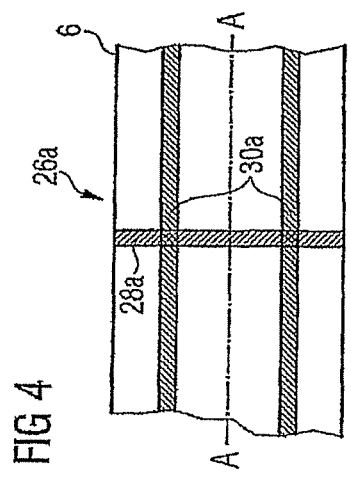
Figure 6:
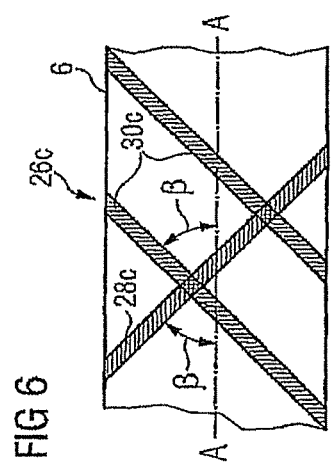

Exemplary embodiments of the invention are described below with reference to the attached figures, in which:

FIG. 1 shows a schematic side view of an aircraft with an aircraft fuselage, in which characteristics of the inventive solution are schematically indicated, FIG. 2 shows a section of the aircraft fuselage illustrated in FIG. 1 in the form of a side view, FIG. 3 shows a schematic representation of two shell component rows of shell components to be connected to one another in accordance with the realization of a fuselage segment that respectively has the shape of an obliquely cut cylinder illustrated in FIG. 2, FIG. 4 shows a schematic representation of a first exemplary embodiment of a backing structure, FIG. 5 shows a schematic representation of a second exemplary embodiment of a backing structure, and FIG. 6 shows a schematic representation of a third exemplary embodiment of a backing structure.

Figure 7:
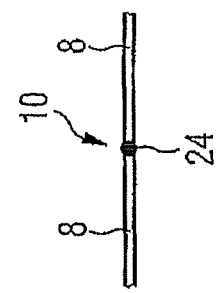
Figure 8:
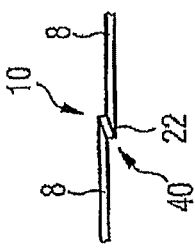
Figure 9:
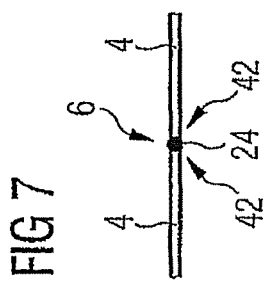
Figure 10:
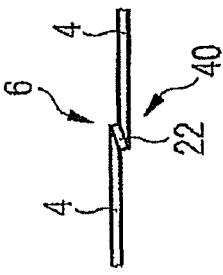

FIG. 7 shows a schematic representation of two shell components that are welded to one another, FIG. 8 shows a schematic representation of two obliquely cut cylinders that are welded to one another, FIG. 9 shows a schematic representation of two shell components that are bonded to one another, and FIG. 10 shows a schematic representation of two obliquely cut cylinders that are bonded to one another.

The following description initially refers to FIG. 1 that shows an aircraft 100 with an aircraft fuselage, wherein this aircraft fuselage features a fuselage segment 2 that forms a central section of the aircraft fuselage of the aircraft 100, wherein a cockpit section 102 is joined to the front end of the aircraft fuselage and a tail section 104 is joined to the rear end.

In the present exemplary embodiment, the aircraft fuselage segment 2 is realized cylindrically, but may also have a different cross section such as, e.g., elliptical. The fuselage segment 2 therefore extends in a longitudinal fuselage segment axis A and is closed in a circumferential direction U extending around this longitudinal fuselage segment axis. A fuselage coordinate system with the longitudinal fuselage axis X, the vertical fuselage axis Z and the lateral fuselage axis Y is defined herein for the fuselage segment 2. The longitudinal fuselage segment axis A extends along and, in particular, in the direction of the longitudinal fuselage axis X, along which the external contours of the outer shell of the fuselage segment also extend. The longitudinal fuselage axis X extends in the flow direction of the air flowing against the aircraft 100 while it flies in the intended fashion. A plurality of shell component rows R1, R2, R3 that are respectively composed of shell components 4 are arranged behind one another viewed in a longitudinal shell component direction LR of the respective shell component row R1, R2, R3 in order to form the skin of the fuselage segment 2. FIG. 2 also shows the center line M4 of the shell component row R2 that also represents the center lines of the corresponding shell components 4.

According to FIG. 3, each of the shell components 4 is realized with longitudinal shell component edges 6 or 241d, 241d; 341c, 341d extending along the longitudinal shell component direction LR and lateral shell component edges 10 or 241a, 241b; 341a, 341b extending transverse thereto, wherein two respective shell component 4 are connected to one another on their lateral shell component edges. In FIG. 3, two shell component rows R2, R3 that respectively feature the shell components 241, 242, 243, 244 and 341, 342, 343, 344 are illustrated in an exemplary fashion in the form of exploded view. In addition, the following features of the shell components identified by the reference symbols 241 and 341 are respectively indicated in FIG. 3: longitudinal shell component edges 241c, 241d and 341c, 341d and lateral shell component edges 241a, 241b and 341a, 341b extending transverse thereto. When the shell component rows R2, R3 are connected to one another, e.g., the longitudinal shell component edge 241d of the shell component 241 of the shell component row R2 is connected to the longitudinal shell component edge 341c of the shell component 341 of the shell component row R3. Within the shell component row R2, the lateral shell component edge 241a of the shell component 241 is connected to the lateral shell component edge 242b of the shell component 242 situated adjacent thereto opposite to the circumferential direction U and its lateral shell component edge 241b is connected to the lateral shell component edge 244a of the shell component 244 situated adjacent thereto in the circumferential direction U. Within the shell component row R3, the lateral shell component edge 341a of the shell component 341 is analogously connected to the lateral shell component edge 342b of the shell component 342 situated adjacent thereto opposite to the circumferential direction U and its lateral shell component edge 341b is connected to the lateral shell component edge 344a of the shell component 344 situated adjacent thereto in the circumferential direction U.

FIG. 3 also shows the center lines M240, M340 of the shell component rows R2, R3 that also represent the respective center lines of the corresponding shell components 241, 242, 243, 244 and 341, 342, 343, 344. The centerlines M240, M340, are defined as a connection line of the centers of the shortest distances between row edges 240-1, 240-2 or 340-1, 340-2 which are lying opposed to each other and are composed by the respective second shell component edges of the shell components which respectively form the ring-shaped shell component rows R2, R3. For example the second shell component edge 241c is part of the row edge 240-1 and the second shell component edge 241d is part of the row edge 240-2. In an embodiment of the invention, the centerlines M240, M340 are lying in a radial plane which extends plane. In another embodiment, the centerlines M240, M340 can be formed such that they can be only part of a curved radial plane. As an example, in FIG. 2 such a center line M4 is also shown.

Furthermore, the longitudinal direction LR of the shell component row R2 that also represents the longitudinal direction of the shell component row R3 and of each individual shell component of the shell component row R2 such as, e.g., the shell component 240 is also illustrated in an exemplary fashion. In addition, FIG. 3 shows the longitudinal direction of a shell component LS, as well as the lateral direction BS of a shell component. The lengths SL240, SL340 of the respective shell component rows R2 and R3 resulting along the longitudinal fuselage segment axis A are furthermore indicated in FIG. 3.

According to an embodiment, a fuselage segment 2 is provided that extends in a longitudinal fuselage segment axis A and is closed in a circumferential direction U around the longitudinal fuselage segment axis, wherein the circumferential direction U lies in a reference radial plane, relative to which the longitudinal fuselage segment axis A extends perpendicularly. The fuselage segment comprises several rows of shell components 4 or pluralities of shell components 4 which form a ring. Each of the shell components 4 of the at least two pluralities of shell components 4 feature two first shell component edges 6 or 241a and 241d, lying opposed to each other and extending along a longitudinal shell component direction LS and two second shell component edges 10 lying opposed to each other and extending along a lateral shell component direction BS. Wherein the shell components 4 of each plurality of shell components 4 are respectively connected to each other at their first shell component edges 6 such that the respective plurality of shell components 4 forms a ring-shaped skin section of the fuselage segment 2 and has a centerline M4, which is defined as a connection line of the centers of the shortest distances between the second shell component edge 10 respectively lying opposed to each other, and which forms a closed line which lies in a first radial plane which is inclined with regard to the reference radial plane by at least 5 degrees, wherein at least two ring-shaped skin sections are connected to each other at the second shell component edges 10 of the shell components 4 of the adjacent ring-shaped skin sections. In the case that the closed line of the center line can only be part of a curved plane, the tangent of points of the reference radial plane and the tangent at points of the respective closed line of each ring-shaped pluralities of shell components enclose an angle between 10 degrees and 60 degrees and in particular between 10 degrees and 45 degrees, wherein the points of the reference radial plane and the respective points of the respective closed line correspond to each other. This means that they have the same coordinate in the circumferential direction U whit regard to a reference XZ-plane.

A plurality of obliquely cut cylindrical shell component rows that are arranged behind one another along the longitudinal fuselage segment axis A form the fuselage segment 2, wherein they are respectively connected to one another along their elliptical edges 42. In this case, the individual obliquely cut cylinders 8 respectively are angularly offset referred to their immediate neighbors due to a rotational movement. In contrast to the second connecting lines 10, the first connecting lines 6 therefore do not form any closed lines, but rather end at a junction point 44 with the second connecting lines 10. This angularly offset arrangement simplifies the respective arrangement of two window openings 32 in a shell component 4 and the respective arrangement of the passenger door opening 34 and a cargo hold door opening 36 at an advantageous height. Consequently, it is not required to change the shape of the shell components 4.

In order to reinforce the fuselage segment 2 that is composed of the shell components 4, a backing structure 26a, 26b, 26c is provided within the fuselage segment 2 and therefore not visible in FIGS. 1 and 2. Different embodiments of the backing structure 26a, 26b, 26c are described below with reference to FIGS. 4 to 6.

In the exemplary embodiment shown, the fuselage segment 2 has circular cross-sectional contours 14 with cross-sectional areas of identical size and shape on its ends viewed in the longitudinal fuselage segment axis. In contrast to this exemplary embodiment, the cross section may also change in the direction of the longitudinal fuselage segment axis A and does not have to be realized with a circular contour. For example, the fuselage segment 2 may also have cross-sectional areas of different size and/or shape on its ends or between these ends along the longitudinal fuselage segment axis such that the fuselage segment 2 deviates, e.g., from the ideal shape of a circular cylinder. Furthermore, the fuselage segment 2 may feature a plurality of window openings 32, a passenger door opening 34 and a cargo hold door opening 36, into which windows and doors can be respectively installed.

The following description also refers to FIG. 2 that shows a fuselage segment as it is illustrated, in principle, in the aircraft 10 of FIG. 1 in the form of a non-perspective and therefore simplified side view. The illustration in FIG. 2—in contrast to the illustration in FIG. 3—does not take into account the spatial curvature of edge lines of shell components 4 that are merely illustrated in the form of straight lines in this case. The fuselage segment 2 is composed of a plurality of shell components 4 that respectively feature two longitudinal shell component edges 6 or two first shell component edge sections 6, as well as two lateral shell component edges 10 or two second shell component edge sections 10. Several of the shell components 4 shown are respectively connected to a closest or directly adjacent shell component 4 along their contacting outer edges or shell component edge sections, along the respective edge sections or along first connecting lines 6 and along second connecting lines 10. For example, a shell component 4 is connected to a first adjacent shell component 4 along the first connecting line 6 and connected to a second adjacent shell components 4 along the second connecting line 10.

According to an embodiment of the invention, the shell components 4 are manufactured of a composite fiber material, particularly a carbon fiber-reinforced plastic that contains reinforcing fibers and, in particular, carbon fibers embedded in a plastic matrix, wherein the shell components are, according to a second embodiment of the invention, manufactured of a metal, particularly aluminum.

The shell components 4 preferably have a quadrangular shape such as, e.g., a rectangular shape and are altogether curved in space about at least one axis in order to form the fuselage segment 2 in the form of a barrel when they are assembled. In the present exemplary embodiment, the shell components 4 may have a size of preferably 1 m² to 12 m². The shell components 4 may have outside dimensions, e.g., between 1 meter by 1 meter and 4 meters by 3 meters. This size generally makes it possible to arrange, for example, two window openings 32 with an opening area 18 for installing a window glass or one respective passenger door opening 34 with an opening area 20 for installing a passenger door or cargo hold door opening 36 with an opening area 38 for installing a cargo hold door within a shell component 4 without having to change the shape of the shell components 4 for this purpose.

The shell components 4 are connected to one another along or a first shell component edge section and along at least a second connecting line 10 or a second shell component edge section such that an ideal first or second connecting line or first or second connecting section is respectively formed. In the present exemplary embodiment, the first edge sections 6 extend along the shorter sides of the rectangular shell components 6 while the second edge sections 10 extend along the longer sides of the rectangular shell components 6.

Due to the curvature of the fuselage segment 2, the respective edge sections 6 and 10 do not extend in one plane, but rather are curved along the surface of the fuselage segment 2. In an ideal geometric observation, the respective edge sections 6 and 10 would theoretically result, in particular, as edge lines along the flat extent of the central plane of the respective shell component 4. This is the reason why the tangents T of the two edge sections 6 and 10 are used for elucidating their arrangement. The tangent T of the first connecting lines 6 may extend relative to the longitudinal fuselage segment axis A of the fuselage segment 2 at an acute angle, e.g., of 30° to 60°, wherein the angle α amounts to 45° in the present exemplary embodiment. In addition, the tangent T of the second edge section 10 may extend relative to the radial plane of the fuselage segment 2 that is defined by the longitudinal fuselage segment axis A at an acute angle, e.g., of 30° to 60°. On the side of the illustrated fuselage segment, namely at the height of the longitudinal axis A and in the projection of the fuselage segment on the X-Z plane, the angle α also amounts to 45° in the present exemplary embodiment. According to an embodiment of the invention with ring-shaped shell component rows, the angular range of 30° to 60° relative to the radial plane of the fuselage segment 2 defined by the longitudinal fuselage segment axis A is defined for the local direction of edges and/or center lines 140M, 240M in a lateral section of the fuselage segment that extends over a quarter of the total circumference of the fuselage segment 2 in the circumferential direction U.

Consequently, the two edge sections 6 and 10 are—viewed in the form of projections on the plane, in which the longitudinal fuselage segment axis A lies—arranged such that they extend relative to the longitudinal fuselage segment axis A extending in the longitudinal direction of the fuselage statement 2 at an acute angle, e.g., of 45°. This increases the length of the first connecting line 6 and the second connecting line 10. Consequently, the overlap of the shell components 4 can be reduced and/or brackets and/or couplings and/or rivets can be eliminated such that the weight of the fuselage segment is additionally reduced.

The following description initially refers to FIG. 4: a first exemplary embodiment of a backing structure 26a features frames 28a that are welded or bonded to a shell component 6 and stringers 30a that are arranged perpendicular thereto and also welded or bonded to the shell component 6. Consequently, the stringers 30a extend in or parallel to the direction of the longitudinal fuselage segment axis A while the frames 28a extend perpendicular to the longitudinal fuselage segment axis A. In this backing structure 26a, the first connecting lines 6, as well as the second connecting lines 10, extend at an acute angle, i.e., an angle greater than zero and not equal to 90°, relative to the principal axes of the frames 28a and stringers 30a, i.e., in the direction of the longitudinal extents of the frames 28a and stringers 30a.

A second exemplary embodiment of the backing structure 26b features stringers 30b that extend in the direction of the longitudinal fuselage segment axis A, i.e. parallel thereto. The frames 28b of the second exemplary embodiment of the backing structure 26b, however, extend relative to the stringers 30b and the longitudinal fuselage segment axis A at an angle β that is not equal to an angle of 90°. In the present exemplary embodiment, the longitudinal fuselage segment axes of the frames 28b extend relative to the longitudinal fuselage segment axis A at an angle β of 45° and, in general, preferably an angle between 30 degrees and 60 degrees. Consequently, the frames 28b according to the second exemplary embodiment extend parallel to the second connecting lines 10 (see FIGS. 1 and 2) and therefore reinforce the fuselage segment 2 in a particularly effective fashion.

A third exemplary embodiment of a backing structure 26c, in contrast, features frames 28c and stringers 30c that are arranged perpendicular to one another. However, the axes of the frames 28c extend relative to the longitudinal fuselage segment axis A at an angle β of 45° in the present exemplary embodiment while the axes of the stringers 30c extends relative to the longitudinal fuselage segment axis A at the same angle β in the present exemplary embodiment. This makes it possible to arrange the frames 28c and stringers 30c such that they extend parallel to or coincide with the first connecting lines 6 and the second connecting lines 10. In this way, the fuselage segment 2 is additionally reinforced.

A first exemplary embodiment for manufacturing an inventive fuselage segment 2 of a metal, particularly of aluminum, is elucidated below with additional reference to FIGS. 7 and 8.

Frames 28a, 28b, 28c and stringers 30a, 30b, 30c according to one of the exemplary embodiments of a backing structure 26a, 26b, 26c described with reference to FIGS. 4 to 6 are initially welded on shell components 4 and connected to one another, e.g., also by means of welding and, if applicable, supplementary clip connections.

In another step, the shell components 4 are connected to one another along the first connecting lines 6 or along the second connecting lines 10. In this case, obliquely cylinders 8 may be formed in a first step by joining the shell components 4 along the first connecting lines 6, wherein these obliquely cut cylinders are then joined into the fuselage segment 2 along the second connecting lines 10. Alternatively, it would, however, also be possible to initially connect several shell components 4 to one another along their second connecting lines 10 and to subsequently connect the shell components 4 to one another along their first connecting lines 6 in a second step. Furthermore, the shell components 4 may be connected along their first connecting lines 6 and along their second connecting lines 10 in an arbitrary sequence and therefore also in a mixed sequence, e.g., if one of the two connecting lines 6, 10 is respectively realized in the form of a helix or helical line.

In this respect, the successive assembly of the fuselage segment 2 by adding one shell component 4 after the other makes it possible to realize a tolerance compensation during the installation of each additional shell component 4. Due to the large number of shell components 4 and their small dimensions in comparison with the overall dimensions of the fuselage segment 2, only slight manufacturing tolerances need to be compensated such that the effort for this tolerance compensation and therefore the overall manufacturing effort are reduced.

The connection along the first connecting lines 6 and along the second connecting lines 10 of the shell components 4 is produced by means of welding. In the present exemplary embodiment, this welding process is realized in the form of friction stir welding. However, it would also be possible to utilize other friction welding methods such as, e.g., rotational friction welding, ultrasonic friction welding or orbital friction welding. In this case, two shell components 4 (see FIG. 7) are arranged end to end along the first connecting line 6 and subsequently welded together in order to produce a welded connection 24 and two obliquely cut cylinders 8 are arranged end to end along their elliptical edges 42 and subsequently welded together in order to produce a welded connection 24 along the second connecting line 10.

Since the shell components 4 are identical, the paths along the first connecting lines 6 and along the second connecting lines 10 are also identical such that a (not-shown) welding robot only needs to be programmed once in order to travel these paths and repeatedly produce welded connections on a shell component 4 such that the manufacturing effort is significantly reduced.

A second exemplary embodiment for manufacturing an inventive fuselage segment 2 of a composite fiber material, particularly of carbon fiber-reinforced plastic, is described below with additional reference to FIGS. 9 and 10.

In this exemplary embodiment, frames 28a, 28b, 28c and stringers 30a, 30b, 30c according to one of the exemplary embodiments of a backing structure 26a, 26b, 26c described with reference to FIGS. 4 to 6 also are initially bonded to shell components 4 and connected to one another in this fashion and, if applicable, with supplementary clip connections.

In another step, the shell components 4 are connected to one another in an arbitrary or predetermined sequence as already explained above with reference to preceding exemplary embodiments.

According to this second exemplary embodiment, the shell components 6 are connected by means of bonding. For this purpose, the shell components 4 are arranged such that a longitudinal joint is formed, i.e., in an overlapping fashion, in order to produce an adhesive connection 22 along the first connecting lines 6 (see FIG. 9). The shell components 4 feature an overlapping region 40, in which the thickness of the shell component 4 continuously decreases toward the edge of the shell component 4. Consequently, the thickness of the 5 shell components changes in the direction of a joining motion of two shell components 4 relative to one another. This eliminates the need for an elaborate shimming process in order to compensate manufacturing tolerances of the shell components 4, i.e., the decreasing thickness of the shell components 4 in the overlapping region 40 has the function of a tolerance compensation element.

Furthermore, the shell components 4 are also provided with an overlapping region 40 that eliminates the need for an elaborate shimming process along the second edge section 10 after an adhesive connection 22 was produced between two oblique cylinders 8 composed of shell components 4.

LIST OF REFERENCE SYMBOLS

2 Fuselage segment
4 Shell component
6 First edge section or first connecting line
8 Obliquely cut cylinder
10 Second edge section or second connecting line
12 Cross-sectional area along first connecting line
14 Cross-sectional area of fuselage segment
16 Shell component surface area
18 Window opening area
20 Passenger door opening area
22 Adhesive connection
24 Welded connection
26a, 26b, 26c Backing structure
28a, 28b, 28c Frames
30a, 30b, 30c Stringers
32 Window opening
34 Passenger door opening
36 Cargo hold door opening
38 Cargo hold door opening area
40 Overlapping region
42 Elliptical edge
44 Junction point
100 Aircraft
102 Cockpit section
104 Tail section
241, 242, 243, 244 Shell component
341, 342, 343, 344 Shell component
241c, 241d and 341c, 341d Longitudinal shell component edges
241a, 241b and 341a, 341b Lateral shell component edges
SL240, SL340 Length of shell component rows R2, R3 in longitudinal fuselage segment axis A
α Angle
β Angle
A Longitudinal fuselage segment axis
140M, 240M Center lines of shell component rows R2, R3
R1, R2, R3 Shell component row
T Tangent
U Circumferential direction
LR Longitudinal direction of a shell component row
LS Longitudinal direction of a shell component
BS Lateral direction of a shell component

The invention claimed is:

1. A fuselage segment that extends in a longitudinal fuselage segment axis and is closed in a circumferential direction around the longitudinal fuselage segment axis, wherein the circumferential direction lies in a reference radial plane, relative to which the longitudinal fuselage segment axis extends perpendicularly, and wherein the fuselage segment comprises:
at least two pluralities of shell components each of which shell components respectively feature two first shell component edges lying opposed to each other and extending along a lateral shell component direction and two second shell component edges lying opposed to each other and extending along a longitudinal shell component direction,
wherein the shell components of each plurality of shell components are respectively connected to each other at their first shell component edges such that the respective plurality of shell components forms a ring-shaped skin section of the fuselage segment and has a centerline, which is defined as a connection line of the centers of the shortest distances between the second shell component edges respectively lying opposed to each other, and which forms a closed line which lies in a first radial plane which is inclined with regard to the reference radial plane by at least 5 degrees,
wherein at least two ring-shaped skin sections are connected to each other at the second shell component edges of the shell components of the adjacent ring-shaped skin sections.

2. A fuselage segment that extends in a longitudinal fuselage segment axis and is closed in a circumferential direction around a coordinate axis in the form of this longitudinal fuselage segment axis, wherein the circumferential direction lies in a reference radial plane, relative to which the longitudinal fuselage segment axis extends perpendicularly, and wherein the fuselage segment features:
a plurality of shell components for forming a skin of the fuselage segment that respectively feature two first shell component edges extending along a lateral shell component direction and two second shell component edges extending along a longitudinal shell component direction, wherein the shell components are respectively connected to at least one adjacent shell component along at least one first shell component edge and to at least one adjacent shell component along at least one second shell component edge, and
a support structure, on which each of the shell components is mounted, characterized in that the plurality of shell components is arranged in such a way that the local direction of the first shell component edges, on which two respective adjacent ring shaped skin sections are connected to one another, and/or the local direction of the second shell component edges, on which two respective adjacent ring shaped skin sections are connected to one another, at least sectionally extend at an acute angle to the reference radial plane defined by the longitudinal fuselage segment axis and, at an angle of 30° to 60° relative to the reference radial plane defined by the longitudinal fuselage segment axis.

3. The fuselage segment according to claim 2, characterized in that the fuselage segment features: at least one shell component row that, in order to form the skin of the fuselage segment, is respectively composed of shell components that are arranged behind one another viewed in a longitudinal shell component row direction of the respective shell component row and respectively feature longitudinal shell component edges extending along the longitudinal shell component direction and lateral shell component edges extending transverse thereto, wherein two respective shell components are connected to one another on the lateral shell component edges.

4. The fuselage segment according to claim 3, characterized in that at least two shell component rows of the plurality of shell component rows are at least sectionally connected to one another on longitudinal shell component row edges that are formed by the longitudinal shell component edges of the shell components of the respective shell component row, wherein the longitudinal shell component row direction results as the center line referred to the longitudinal shell component edges of a respective shell component row, and wherein the local direction of the respective center line of the shell component rows respectively extends at an angle of more than 10 degrees and, at an angle between 30° and 60 degrees relative to the reference radial plane defined by the longitudinal fuselage segment axis.

5. The fuselage segment according to claim 2, characterized in that the longitudinal shell component edges of the nominal surface of a plurality of shell components that is developed on the plane extend parallel to one another over at least 80% of the length of the respective longitudinal shell component edges.

6. The fuselage segment according to claim 2, characterized in that several of the shell component rows of the plurality of shell component rows respectively form a closed ring.

7. The fuselage segment according to claim 2, characterized in that several shell component rows of the plurality of shell component rows are arranged behind one another in the longitudinal shell component direction, wherein two respective shell component rows that are arranged behind one another are connected at their ends that are formed by lateral shell component edges such that the several shell component rows altogether extend in a helical fashion in the circumferential direction and along the longitudinal fuselage segment axis.

8. The fuselage segment according to claim 2, characterized in that several shell component rows of the plurality of shell component rows are connected to one another end to end by welding.

9. The fuselage segment according to claim 2, characterized in that the connection of longitudinal shell component edges and/or lateral shell component edges of respectively different interconnected shell components is realized such that the respective interconnected shell components overlap one another with edge sections extending on the respective longitudinal shell component edges and/or lateral shell component edges, and in that the respectively overlapping edge sections are bonded to one another.

10. The fuselage segment according to claim 2, characterized in that at least one shell segment features at least one opening in the form of a window opening for installing a window glass and/or a passenger door opening for installing a passenger door and/or a cargo door opening for installing a cargo door, wherein the respective peripheral edge of the opening is situated within the region, in which the respective shell component extends in a planar fashion.

11. A method for manufacturing a fuselage segment with shell components that are mounted on a support structure and form a skin of the fuselage segment that extends in a longitudinal fuselage segment axis and is closed in a circumferential direction extending around the longitudinal fuselage segment axis, characterized in that a plurality of shell component rows is formed on the support structure by arranging and mounting shell components on the support structure in such a way that at least the direction of a tangent on first shell component edges, on which two respective shell components are connected to one another, and/or on second shell component edges, on which two respective shell components are connected to one another, extend at an acute angle relative to the longitudinal fuselage segment axis and, in particular, at an angle of 30° to 60° relative to the longitudinal fuselage segment axis.

12. The method for manufacturing a fuselage segment according to claim 11, characterized in that a plurality of shell component rows is formed on the support structure by arranging and mounting shell components on the support structure in such a way that the local direction of the center line of the respective shell component rows being formed extends at an angle of less than 90 degrees relative to the longitudinal fuselage segment axis.

13. The method for manufacturing a fuselage segment according to claim 11, characterized in that the shell components are arranged and mounted on the support structure in such a way that one respective shell component row is successively arranged behind another shell component row in the longitudinal fuselage segment axis.

* * * * *